3,088,840
TREATMENT OF TITANIUM DIOXIDE
Kenneth Arkless, Stockton-on-Tees, and Edward Whayman, Middlesbrough, England, assignors to British Titan Products Company Limited, Billingham, England, a corporation of Great Britain
No Drawing. Filed Nov. 13, 1959, Ser. No. 852,603
Claims priority, application Great Britain Sept. 3, 1959
20 Claims. (Cl. 106—300)

This invention comprises a process for the treatment of titanium dioxide which has been produced by the vapor phase oxidation of a titanium tetrahalide, especially titanium tetrachloride.

It is well known that titanium dioxide produced by reaction of titanium tetrahalide with gases containing oxygen and/or water vapor are acidic in character due to the presence of the halogen radical being in part adsorbed or bonded to the titanium dioxide surface. This feature can be objectionable in the various uses to which titanium dioxide is ultimately destined.

Various proposals have been made for neutralizing or reducing the acidic character of the titanium dioxide product. These include treatment with alkaline reacting materials, generally performed upon aqueous slurries of the titanium dioxide, and also heat treatment at temperatures of at least 500° C. with boron oxide which may have been produced in situ from boric acid. Due to such treatment, however, the titanium dioxide becomes contaminated, to an extent which is generally undesirable, with the treating agent or with compounds produced therefrom.

The object of the present invention is to provide a process for neutralizing or reducing, to a pH of say 5 to 8, the acidic character of the titanium dioxide, produced by the vapor phase oxidation of a titanium tetrahalide, which can be applied economically and effectively for that purpose in various ways and which will not result in contamination of the treated product to an undesirable extent, if at all.

This object is achieved by the invention which is characterized by the step of submitting the titanium dioxide to the action of steam or of a gas, e.g. air, containing not less than 20% water vapor, in the presence of a small proportion of a boron compound which is in the vapor phase or will be brought into the vapor phase in the course of the treatment. A particularly suitable boron compound is boric acid.

The amount of the boron compound, calculated as $B_2O_3$ and based on the weight of the titanium dioxide, may be from 0.005 to 5%, preferably 0.05 to 5%.

The treatment may be performed at atmospheric pressures or at pressures lower or higher than atmospheric pressure. The temperature at which the treatment is carried out must be such as to ensure that the water and the boron compound will be in the vapor phase. Generally the temperature is from 50 to 500° C., preferably 150 to 500° C.

The duration of the treatment at any particular temperature depends mainly on the concentration of the boron compound and on the need to ensure that it will get into intimate association with all the particles of the titanium dioxide. An hour or two would be normally appropriate but it could be as short as ten minutes or as long as three or more hours.

The boron compound is preferably introduced into the treatment zone entrained as vapor in the steam or in the gas containing water vapor, but it may be introduced in the solid state, for example added to the titanium dioxide so as to be intimately associated therewith.

The titanium dioxide, whilst undergoing the treatment, may be in the mass in a substantially static state or mechanically agitated or disturbed or brought into a state of movement or turbulence by the fluid bed technique. Alternatively, it may be entrained in suspension in air or other gas or in the treating vapors.

With particular advantage the treatment of the invention may be carried out in the course of grinding or milling the titanium dioxide. This applies especially when the milling is effected in a fluid energy mill and where the fluid employed may be steam carrying the vapor of the boron compound.

The treatment of the invention may include a further operation of removing excess boron compound which may readily be effected by treatment with steam only. This further operation may therefore be simply a continuation of the main treatment in the case where steam is brought into contact with titanium dioxide already associated with the boron compound. Alternatively, if the boron compound is introduced with the steam or gas containing water vapor, the subsequent treatment may consist in continuing to introduce the steam or gas containing water vapor but without the boron compound.

A particular further advantage of the present invention is that it can be applied effectively to the titanium dioxide after the latter has undergone a coating operation, such coating being produced by a vapor phase operation, e.g. in the course of the vapor phase oxidation of the titanium tetrahalide by introducing one or more metal or metalloid halides to be subsequently oxidized or hydrolyzed either simultaneously or consecutively, or it may be produced by wet treatment in the customary manner. This is important because titanium dioxide pigments which have been coated by a vapor phase operation are normally particularly resistant to neutralization without impairing the properties conferred on them by the coating.

The following examples are given for the purpose of illustrating the invention:

*Example 1*

50 gms. rutile pigment prepared by the procedure of British specification No. 791,657, Example 3, were fed into a paddle mixer which consisted of a horizontal cylindrical drum 2" diameter, 1 ft. long, made of silica, having along its axis a rotating shaft carrying lengthwise a perforated plate of corrosion-resistant metal which extended to the periphery so that as it rotated it would lift solids from the bed of titanium oxide in the mixer and thus serve for continually exposing new surfaces. From one end of the paddle mixer, steam containing 0.1% weight by weight of boric acid was introduced to pass to the opposite end at the rate of 2 gms. of $H_2O$ per minute, the mixer being maintained throughout at a temperature of 150° C. The treatment was continued for a period of two hours and a sample of the product was removed for testing. It was found that, by preparing a slurry in water containing 20% of the $TiO_2$ product and stirring for a period of two minutes, the pH was 6.2. The residual chlorine value of the product was less than 0.01% and the boron content was 0.09% $B_2O_3$ both on a weight basis. This is compared with the pigment before treatment which on the same test had a pH of 2.9 and a residual chlorine content of 0.066%. By conducting the same experiment without the use of boric acid, the pH by the same test was raised only to 3.2.

*Example 2*

50 gms. rutile pigment, as used in Example 1, were admixed with 0.5% weight by weight boric acid and introduced into a horizontal paddle mixer as described in Example 1. The mixture was raised to 150° C. and steam was passed therethrough at the rate of 2 gms. $H_2O$ per minute for a period of three-quarters of an hour. The pigment before treatment had a pH of 2.9 and subsequent to treatment this value was increased to 6.7. The residual boron content was 0.2% $B_2O_3$ and the final chlorine content was 0.016% both on a weight basis.

*Example 3*

Rutile pigment prepared by the method of Example 2 of U.S. application Serial No. 801,473, filed March 24, 1959, but with increased $AlCl_3$ flow rate to give 2% $Al_2O_3$ and 0.7% active $TiO_2$ on the pigment, was introduced into a paddle mixer as described in Example 1, maintained at 150° C., and exposed therein to an atmosphere of steam containing 0.5% on a weight basis of boric acid, the vapor being admitted at the rate of 3 gms. $H_2O$ per minute. After an exposure of one hour the titanium oxide was found to have increased in pH from 3.9 to 6.6 (by the method of testing given above) and the boron residue was found to be 0.22% $B_2O_3$ on a weight basis.

In the absence of boric acid it was found that a temperature of 350° C. was required to raise the pH of the pigment to a value of 6 (by the same method of testing). Further, it was found that at this temperature some detrimental modification of the coating had occurred, i.e. the material was found to have less resistance to weathering.

What is claimed is:

1. A process of reducing the acidity of titanium dioxide particles produced by reaction of titanium tetrahalide vapor with oxidizing gas resulting in a suspension of particulate titanium dioxide in gas from said reaction, which particulate titanium doxide is separated from said gas suspension, which comprises feeding water vapor to a zone at 50° to 500° C. to contact said separated titanium dioxide particles therein while distributing through the titanium dioxide particles in said zone a small amount of boron compound in vapor state which on interreaction with water forms boric acid, which boron compound and water vapor are provided in said zone in an amount sufficient to reduce the acidity of said titanium dioxide to a pH of at least 5.

2. A process of reducing the acidity of titanium dioxide particles produced by reaction of titanium tetrahalide vapor with oxidizing gas resulting in a suspension of particulate titanium dioxide in gas from said reaction, which particulate titanium dioxide is separated from said gas suspension, which comprises feeding water vapor to a zone at 50° to 500° C. to contact said separated titanium dioxide particles therein while distributing through the titanium dioxide particles in said zone a small amount of boric acid in vapor state, which boric acid and water vapor are provided in said zone in an amount sufficient to reduce the acidity of said titanium dioxide to a pH of at least 5.

3. Process of claim 1 in which the boron compound vapor is introduced into the treatment zone entrained with the water vapor.

4. Process of claim 1 in which the water vapor is carried by air in an amount of at least 20% based on the amount of the air together with the water vapor.

5. Process of claim 1 in which the boron compound is introduced into the treatment zone in the solid state, the process being performed at a sufficiently high temperature to vaporize the boron compound.

6. Process of claim 5 in which the solid boron compound is introduced in intimate association with the titanium dioxide to be treated.

7. Process of claim 1 in which the amount of the boron compound, calculated as $B_2O_3$ and based on the weight of the titanium dioxide, is from about 0.005 to 5%.

8. Process of claim 1 in which the amount of the boron compound, calculated as $B_2O_3$ and based on the weight of the titanium dioxide, is from about 0.05 to 5%.

9. Process of claim 1 in which the titanium dioxide is mechanically agitated during the treatment.

10. Process of claim 1 in which the titanium dioxide is undergoing milling whilst being treated.

11. Process of claim 1 in which the titanium dioxide is undergoing milling in a fluid energy mill, the fluid being steam carrying the vapor of the boron compound.

12. Process of claim 1 characterised by the further step of submitting the treated titanium dioxide to the action of steam in order to remove therefrom residual boron compound.

13. Process of claim 1 in which the titanium dioxide which is treated consists of particles of titanium dioxide coated with an oxide of an element, other than titanium, selected from the group consisting of metals and metalloids.

14. Process of claim 1 in which the titanium dioxide which is treated consists of particles of titanium dioxide coated with an oxide produced by the vapor phase oxidation of the halide of an element, other than titanium, selected from the group consisting of metals and metalloids.

15. The process of claim 1 wherein the amount of boron compound is sufficient to raise the pH of the titanium dioxide from above about 5 to about 8.

16. The process of claim 2 wherein the amount of boric acid is sufficient to reduce the acidity of said titanium dioxide to a pH above about 5 to about 8.

17. The process of claim 2 wherein the boric acid is introduced as a vapor entrained with the water vapor and thereby contacted with said titanium dioxide.

18. The process of claim 2 in which the water vapor is carried by air in an amount of at least 20 percent by weight based on the amount of air together with the water vapor.

19. The process of claim 2 in which the amount of boric acid, calculated as $B_2O_3$ and based on the weight of titanium dioxide, is from about 0.005 to 5 percent.

20. The process of claim 2 in which the titanium dioxide is undergoing milling in a fluid energy mill, the fluid being steam carrying boric acid vapor.

References Cited in the file of this patent

UNITED STATES PATENTS

| | | |
|---|---|---|
| 2,512,079 | Werner | June 20, 1950 |
| 2,514,855 | Goetchius et al. | July 11, 1950 |
| 2,739,904 | Frey | Mar. 27, 1956 |

FOREIGN PATENTS

| | | |
|---|---|---|
| 558,240 | France | Aug. 23, 1923 |
| 820,351 | France | Nov. 9, 1937 |